H. D. BACON.
STUFFING BOX AND BEARING FOR SHAFTS OF MARINE PROPELLERS.
APPLICATION FILED SEPT. 12, 1912.
1,075,080.
Patented Oct. 7, 1913.
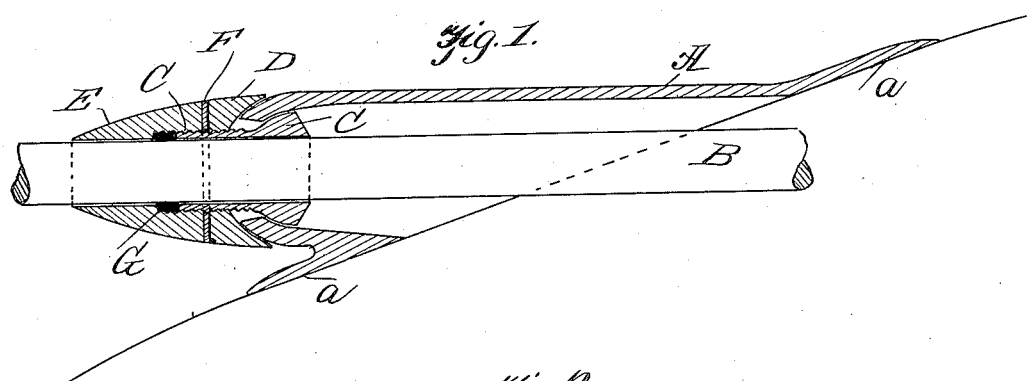
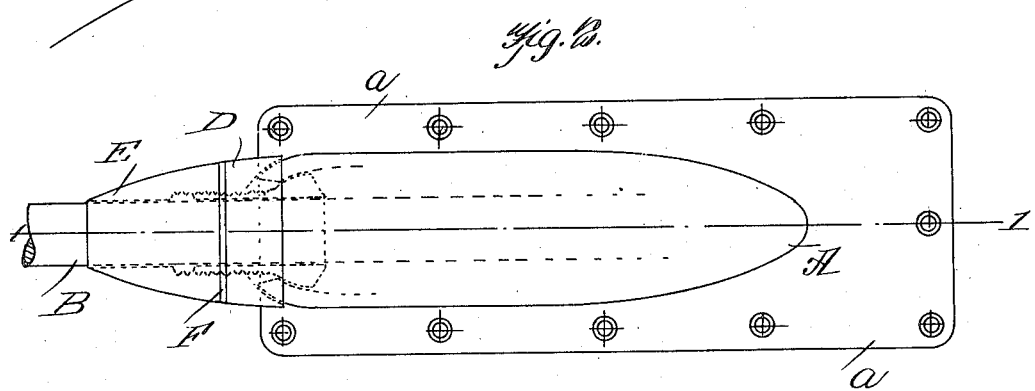
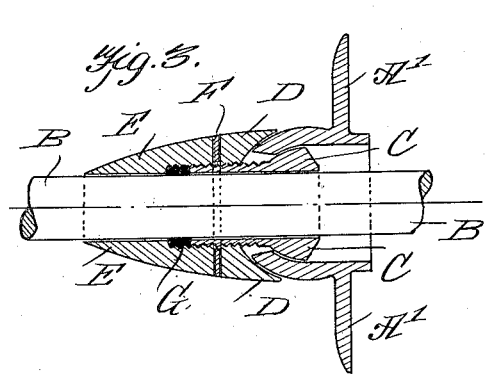
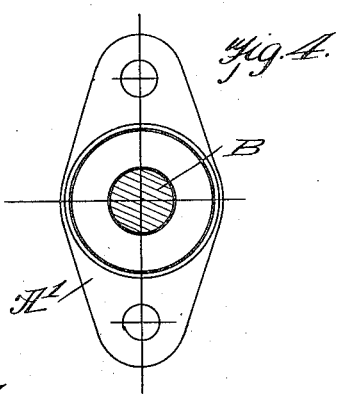
WITNESSES
INVENTOR
HENRY D BACON,
BY
ATTORNEYS

UNITED STATES PATENT OFFICE.

HENRY DOUGLAS BACON, OF BATH, MAINE.

STUFFING-BOX AND BEARING FOR SHAFTS OF MARINE PROPELLERS.

1,075,080. Specification of Letters Patent. Patented Oct. 7, 1913.

Application filed September 12, 1912. Serial No. 719,948.

*To all whom it may concern:*

Be it known that I, HENRY DOUGLAS BACON, a citizen of the United States, and a resident of Bath, in the county of Sagadahoc and State of Maine, have invented an Improved Stuffing-Box and Bearing for Shafts of Marine Propellers, of which the following is a specification.

The chief object of my invention is to provide a shaft stuffing-box and bearing that offers minimum friction to the water as the boat or other craft is propelled through it, and will readily adapt itself to any angular shifting or displacement of the shaft relative to the keel. The result is attained by the construction, arrangement, and combination of parts hereinafter described, and illustrated in the accompanying drawings.

Figure 1 is a vertical longitudinal section of my invention applied to a boat hull. Fig. 2 is a plan view of the same. Fig. 3 is a longitudinal section showing a modification of the housing adapted to be secured to a hull. Fig. 4 is an inner face view of the housing, a propeller shaft being shown in section. Fig. 5 includes a face and edge view of a locking washer.

A indicates what is often termed a shaft log, the same consisting of a metal casing or housing through which a propeller shaft B extends, and whose chamber is of sufficient diameter and capacity to permit any possible angular shifting or displacement of the shaft. The said housing has a lateral flange $a$ extending around it and at such inclination as adapts it to fit against the stern of a boat hull to which it is attached by screws, as shown in Fig. 2.

The stuffing-box and shaft bearing are formed by said housing and three other coacting parts indicated by letters C, D, and E. The part C is in the form of a threaded sleeve that receives the shaft B and is provided with a hemispherical head that is located within the conical end of the housing A and is formed concentrically therewith. The opening in the conical end of the housing A is of such greater diameter than this part C as to permit any lateral shifting or displacement of the shaft and the sleeve bearing. The second member D is a lock nut which is screwed on the body of the sleeve bearing C and whose inner side or face is formed concentrically with the conical end of the housing against which it is fitted loosely and with which it works in frictional contact. In other words, the conical end of the housing is arranged between and concentrically with the hemispherical head of the sleeve bearing C and the inner face of the locking nut D. The third member E is what is often termed a fair-water nut, it being screwed on the outer end of the sleeve of bearing C and tapered outwardly of the outer side. Its flat head or face is adjacent to the corresponding outer end of the locking nut D, and between them an annular spring locking washer F—see Fig. 5—may be interposed as shown. Soft packing G is arranged within the fair-water nut E adjacent to the end of the sleeve bearing C and the same is suitably compressed when the parts are screwed tightly together.

In Figs. 3 and 4, the housing A' is constructed with radial flanges in place of inclined ones, as shown in Figs. 1 and 2, by which construction the housing is adapted for application to boat hulls having square or flat sterns.

The shaft housing and the parts C and D with which it works in frictional contact having all the form of a half circle with a common radius, it is evident that the shaft B can turn about the center of this circle to any point within the limit of the opening within the housing, it being only necessary for this purpose to slack the locking nut slightly.

By this construction and combination of parts, I produce a stuffing-box and bearing which offers minimum resistance to water, effectually prevents leakage, has little friction, allows any required shifting or displacement of the shaft, and is strong, durable, and may be constructed and applied at small cost.

It is to be understood also that various changes may be made in the details of construction without affecting the scope of my invention.

What I claim is:—

1. The improved stuffing-box and bearing for a propeller shaft, comprising a shaft-support or housing having lateral flanges adapted for attachment to a boat-hull and its outer end constructed in conical form, a sleeve bearing adapted to receive the shaft and having a hemispherical head formed on lines concentric with the outer end of the housing which incloses the same, and a locking nut screwed on the outer end of the sleeve and having its inner face formed concentrically with the adjacent conical end of the housing which is interposed between the conical head of the sleeve and the nut, as described.

2. The combination with a chambered housing adapted to be attached to a boat hull and having a conical outer end, a sleeve bearing having a hemispherical head formed on lines concentric with the inner and outer sides of the end of the housing, a locking nut screwed on the sleeve and having its inner face formed concentrically with the adjacent end of the housing and the spherical head of the sleeve bearing, and a fairwater nut also screwed on the sleeve bearing and tapered toward its outer end on lines coinciding with the outer side of the locking nut, as described.

HENRY DOUGLAS BACON.

Witnesses:
ARTHUR J. DUNTON,
EVA J. CARLTON.